UNITED STATES PATENT OFFICE.

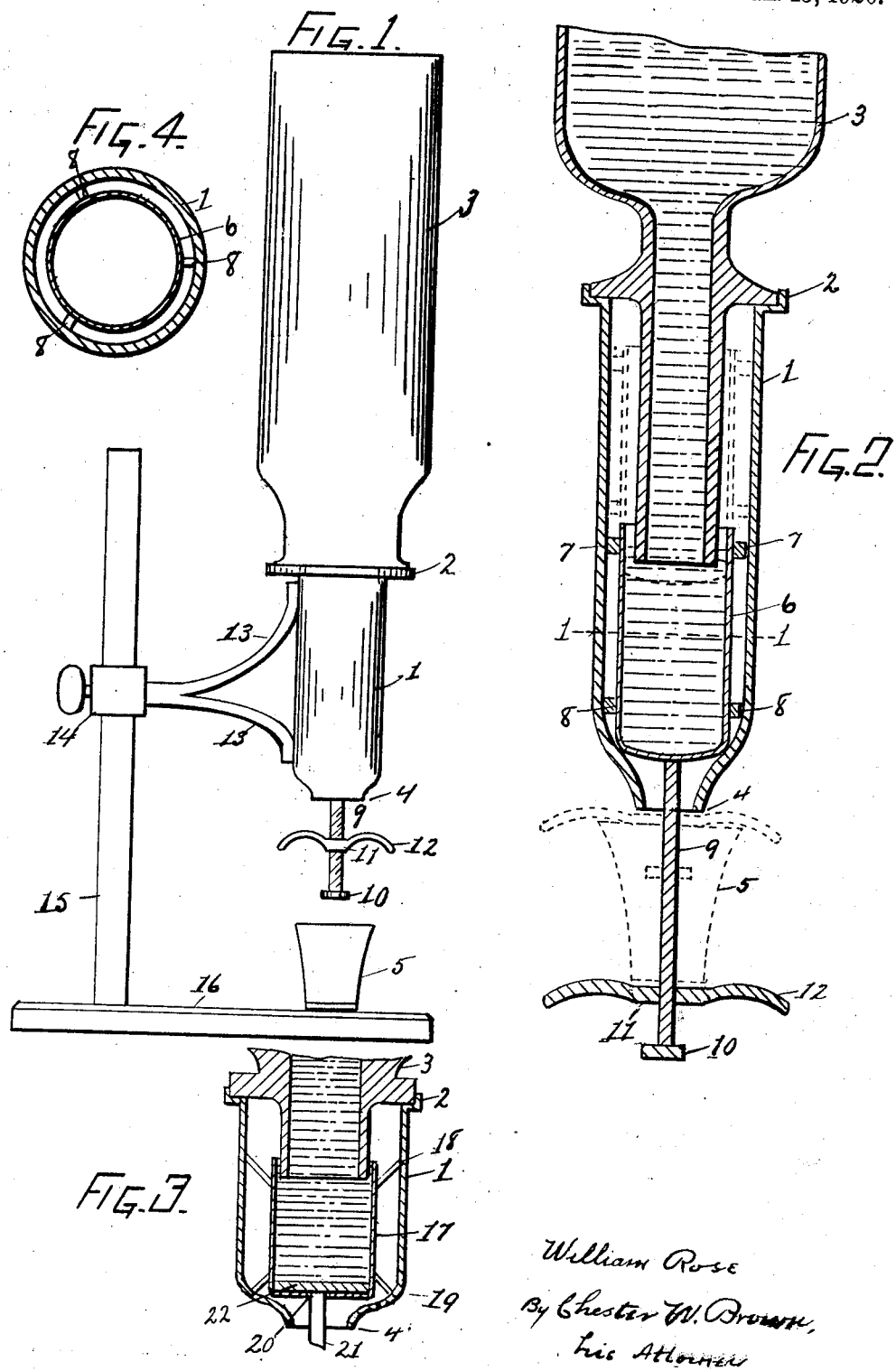

WILLIAM ROSE, OF CHICAGO, ILLINOIS.

LIQUID-MEASURING DEVICE.

1,327,686.  Specification of Letters Patent.  Patented Jan. 13, 1920.

Application filed July 7, 1919. Serial No. 309,184.

*To all whom it may concern:*

Be it known that I, WILLIAM ROSE, a citizen of the United States, residing at the city of Chicago, in the county of Cook and State of Illinois, have invented a new and useful Improvement in Liquid-Measuring Devices, of which the following is a specification.

The object of my said invention, is to provide a liquid measuring device for use with fruit juice bottles, or at soda fountains, for quickly, and accurately dispensing a predetermined quantity of fruit juice, or other liquid into a glass or receptacle held thereunder. Another object is to provide a device of the class described which can be readily adjustable for different quantities. Still another object is to provide a device of the class described which has no valves to leak, or become stuck by the sugar in many of the juices and liquids which it is desired to measure. Other objects will be readily apparent from the accompanying illustration and description.

In the drawings which accompany this specification, and form a part thereof, and in which like numerals of reference refer to similar parts throughout the various figures, Figure 1 is an elevation of the preferred construction of my said device, showing it mounted upon a stand, and supporting the fruit juice bottle.

Fig. 2 is a section view, showing the construction of the operating parts.

Fig. 3 is a variation which may be employed, shown in section.

Fig. 4 is a transverse section taken on the line 1—1 of Fig. 2.

In the accompanying illustration, I have shown my invention as adapted to hold and measure the fruit juice or other liquid from a fruit juice bottle of the usual size and shape, and for this purpose I provide a tube 1 of a suitable size, and enlarged at its upper extremity as at 2, to receive and support the fruit juice bottle 3, as shown. At the lower end 4 of the said tube 1, I have partially closed said tube to produce a mouth for discharging the liquid into a small glass or other receptacle 5. Within the tube I have provided a cup-shaped member 6, having the lugs 7 and 8 for guiding it in said tube as it moves upward and downward in its operation. To the lower portion of said member 6 I have attached the rod 9, having the button 10 rigidly attached at its lower extremity, and the threaded nut 11 having the curved fingers 12 for engaging the glass and also the mouth of the tube. The rod 9 is threaded at its lower portion to permit the operation of the nut thereon as hereinafter described. In Fig. 1 I have shown this device as supported by the arms 13, connected with the clamp 14 firmly attached to the upright stand 15 by means of the set screw. The base of said stand at 16 may be stone or metal as desired to support the device in the position as shown. At Fig. 3 I have shown a variation in my said device, in which I have employed an inner tube 17, in place of the cup-shaped member 6, said inner tube being attached to the outer tube at 18 and 19 by brackets. The lower end of said inner tube 17 has the opening 20 through which passes the rod 21. Said rod 21 carries a plunger at its upper end as 22 which fits water tight in the inner tube 17.

To operate my said device, a fruit juice bottle containing the liquid to be dispensed, is placed in the upper end of the tube 1, as shown, the tube and parts being inverted, if necessary, during the installation of said bottle. When the device is placed in the vertical position shown, the liquid flows out of the mouth of the bottle into the cup beneath it, filling this cup above the mouth of the bottle a sufficient distance to form a water-seal preventing the flow of more liquid from the bottle. When it is desired to dispense a quantity of the liquid, the glass is placed beneath the fingers, and pressed upward, until the fingers come into contact with the lower extremity of the tube. The cup at the upper end of the rod is also forced upward, and the mouth and neck of the bottle, over which it is forced, displace a certain quantity of liquid which flows over the top of the cup and downward between the cup and the tube, through the lower end of the tube, into the glass. When the glass is removed, the weight of the liquid in the cup returns the cup to its position at rest in the bottom of the tube, and a portion of the liquid in the cup having been removed, there is not sufficient remaining to cover the mouth of the bottle; therefore air is admitted to the bottle, and a sufficient amount of liquid flows out to raise the liquid in the cup to again form an air-seal to prevent further flow. By rotating the nut carrying the fingers it may be raised, or lowered upon the rod, thereby increasing the distance the cup moves upward, or decreasing it, thereby also increasing or decreasing the amount of liquid dispensed at each operation. While I have shown my said device as attached to a stand, it may be attached directly to the neck of a bottle without the stand, if the operator so desires.

In Fig. 3 I have shown a variation, in which a plunger 22 is forced upward, when the glass is pressed against the fingers carried by the rod. The neck of the bottle displaces a certain amount of liquid the same as in the former type, which flows downward into the glass below.

When my device is employed with soda fountains, or other fixed source of supply of the liquid, my device is adjusted over the outlet from said fountain, with the opening from the fountain well down in the cup, the same as the mouth of the bottle is shown in the illustration herewith, and the operation is in all respects identical with that as described above.

Having thus described my said invention, what I claim, and desire to secure by Letters Patent, is the following:

1. A dispenser for inverted bottles comprising a tube open at its upper end to receive a bottle neck and having a tapering, open, lower end, a cup slidable in the tube and resting normally on the inner surface of the tapering lower end of the tube to normally close the lower end of the tube, the upper end of the cup surrounding the lower end of the bottle neck in spaced relation to the latter, means to guide the cup in the tube, and a rod connected to the cup and projecting through the lower end of the tube for manipulation to slide the cup in the tube.

2. A dispenser for inverted bottles comprising a tube open at its upper end to receive a bottle neck and having a tapering, open, lower end, a cup slidable in the tube and resting normally on the inner surface of the tapering lower end of the tube to normally close the lower end of the tube, the upper end of the cup surrounding the lower end of the bottle neck in spaced relation to the latter, means to guide the cup in the tube, and a rod connected to the cup and projecting through the lower end of the tube for manipulation to slide the cup in the tube, the rod being screw-threaded, and means having working fit on the rod and against which means a vessel is placed to move the rod and consequently slide the cup in the tube.

3. A dispenser for inverted bottles comprising a tube open at its upper end to receive a bottle neck and having a tapering, open lower end, a cup slidable in the tube and resting normally on the inner surface of the tapering lower end of the tube with its upper end surrounding the lower end of the bottle neck to form a seal therebetween, a rod connected to the cup and projecting through the lower end of the tube, the rod being screw-threaded, and a member having working fit intermediate its ends with the screw-threaded rod and against which member a vessel is placed to shift the rod and consequently slide the cup off the lower end of the tube and affect a discharge of fluid from the cup down between the latter and the tube and into a vessel.

4. A dispenser for inverted bottles comprising a tube open at its upper end to receive a bottle neck and having an open lower end, a cup arranged within the tube and having its upper end surrounding the lower end of the bottle neck to provide a seal, and means including a rod projecting through the lower end of the tube and operable for sliding movement to effect a discharge of fluid from the cup between the inner walls of the latter and the bottle neck and down through the tube between the latter and the outer walls of the cup and through the open lower end of the tube.

In testimony whereof, I have hereunto subscribed my signature in the presence of two witnesses.

WILLIAM ROSE.

Witnesses:
M. J. PADDON,
CHESTER W. BROWN.